United States Patent
Cameron

[11] 4,080,569
[45] Mar. 21, 1978

[54] RADIO TRANSCEIVER DIMMER SWITCH

[76] Inventor: Lester L. Cameron, 20802 Claretta, Lakewood, Calif. 90715

[21] Appl. No.: 724,012

[22] Filed: Sep. 16, 1976

[51] Int. Cl.² .............................................. H04B 1/38
[52] U.S. Cl. ..................... 325/15; 325/144; 343/850
[58] Field of Search ................ 323/8, 63, 81; 325/15, 325/67, 133, 140, 144, 160, 167, 176, 178, 187, 21, 22; 343/721, 749, 850, 852, 894

[56] References Cited
U.S. PATENT DOCUMENTS

| | | | |
|---|---|---|---|
| 1,461,754 | 7/1923 | Clark | 325/160 |
| 1,830,880 | 11/1931 | Misenheimer | 343/850 |
| 2,485,171 | 10/1949 | Seright | 325/133 |
| 3,226,723 | 12/1965 | White | 343/852 |

*Primary Examiner*—Benedict V. Safourek
*Attorney, Agent, or Firm*—Dominick Nardelli

[57] ABSTRACT

A two-pole switch is placed in series between two lengths of a coaxial cable that extends from a transceiver to an antenna. When the switch is in the first pole position, little or no resistance or impedance is added to the circuit, and when the switch is in the second pole position, a resistor is added in series with the center conductors of both lengths and another resistor is connected across the center and outer conductor of the coaxial cable. Preferably this other resistor is an incandescent lamp so that the operator of the transceiver, when broadcasting, has a visible indication showing in which pole position the switch is, because now most of the output power of the transceiver passes through the lamp to light it.

4 Claims, 1 Drawing Figure

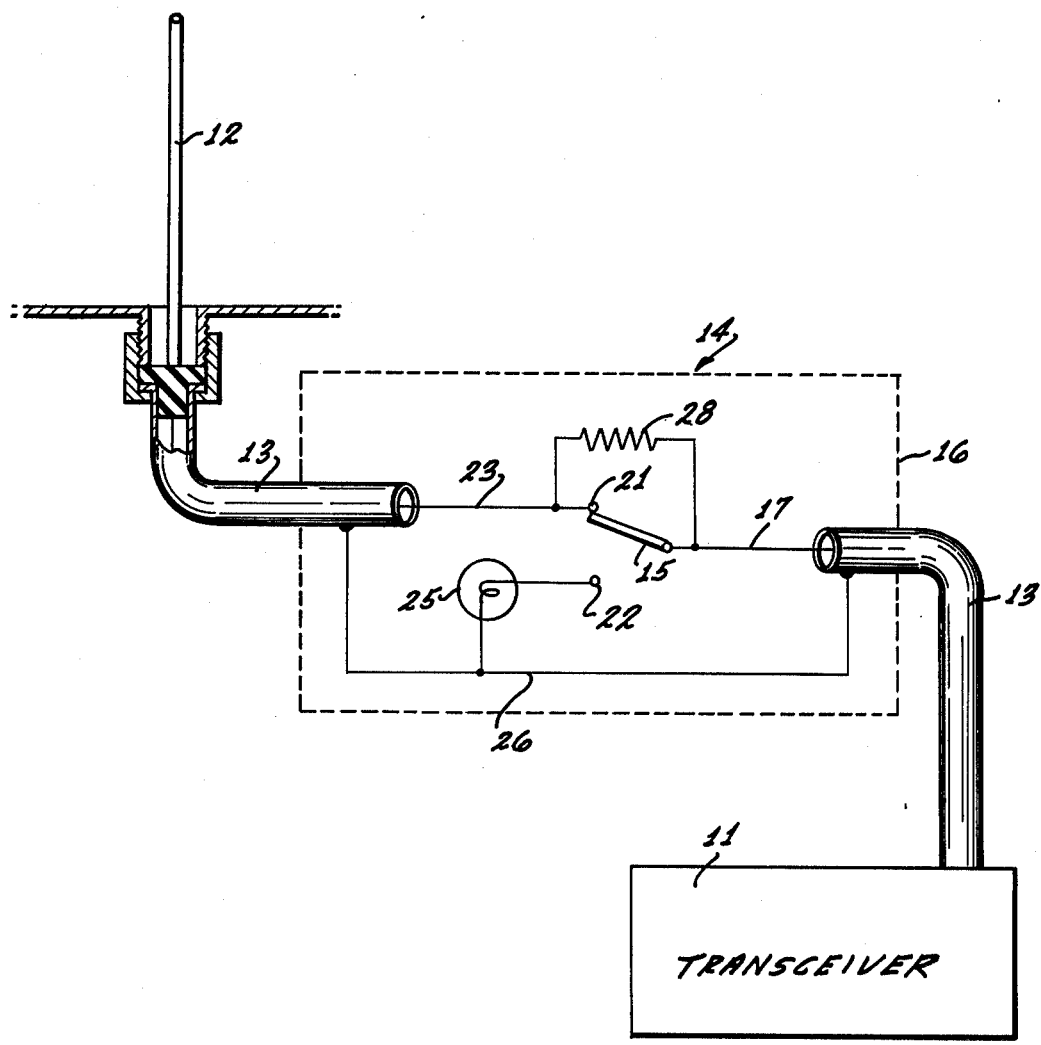

RADIO TRANSCEIVER DIMMER SWITCH

FIELD OF THE INVENTION

This invention relates to means for protecting transceivers from high energy radio signals and, more particularly, to a simple, reliable and economical means to perform the same.

BACKGROUND OF THE INVENTION

Radio transceivers which operate at frequencies commonly known as "citizens-band" have become very popular in that a mobile unit has been installed in many automobiles, trucks, and other moving vehicles. Most transceivers on today's market have an inherent drawback in that if the incoming signal is very strong, the transceiver may be damaged by the signal. The transceiver then must be repaired. Mobile units are more prone to this mishap than base or stationary units because two mobile units on the same channel could, at times, come very close together. For example, as when one vehicle passes another on a highway. Elementary physics explains that the wattage received by a unit is inversely related to the cube of the distance between the transmitting unit and the receiving unit. Then one can see that when a unit is transmitting more power than allowed by the FCC, another unit that is receiving is very likely to be damaged.

OBJECTS OF THE INVENTION

An object of this invention is to provide a means in a coaxial cable leading from a transceiver to an antenna, which means bypasses some of the incoming power from the transceiver.

Another object is to provide a means that also limits transmission while limiting incoming power.

Another object is to provide a light in combination with the above means so that the light is only visible whenever the unit is transmitting, indicating that the means is in the limiting incoming power position.

These and other objects and features of advantage will become more apparent after studying the following description of the preferred embodiment of my invention, together with the appended drawing.

BRIEF DESCRIPTION OF THE DRAWING

The sole FIGURE is a schematic showing my novel means coupled between two lengths of a coaxial cable.

DETAILED DESCRIPTION OF THE DRAWING

Referring to the drawing, there is shown a standard radio transceiver 11 connected to a standard aerial 12 by standard coaxial cable 13. My invention consists, primarily, of cutting the coaxial cable 13 at a convenient place and inserting my novel means 14 therebetween. Although the drawing shows means 14 schematically, one skilled in the art could readily package it into a convenient sized box shown by dash lines 16, which box is shorted to the outer conductor of cable 13.

The means 14 consists of a double pole which, having an arm 15, connected to a center conductor 17, which is, in turn, coupled to the transceiver. The switch has two poles, 21 and 22, wherein pole 21 is connected to a center conductor 22 which is, in turn, coupled to the antenna 12 and wherein pole 22 is connected in series with a light bulb 25 and the outer conductor 26 of the coaxial cable. Center conductors 17 and 22 are coupled together by a resistor 28. In the prototype the value of resistor 28 was, for example, between 5000 to 8000 ohms and the light bulb was chosen as a standard 6-watt 12-volts bulb.

In normal operation, the switch is thrown so that arm 15 contacts pole 21 and one, by following the circuit, observes that bulb 25 and resistor 28 are both out of the circuit. In the protection mode of the operation wherein one desires to limit the incoming power and inherently limits to outgoing power, the switch is thrown so that the arm 15 contacts pole 22. By tracing the circuit, one finds that the resistor 28 is in series with both center conductors 17 and 22 and lamp 25 is connected across conductor 17 and 26. Therefore, in transmitting, some of the transmitted power is consumed in the lamp 25 whereby it could glow. Lamp 25 is preferably of the non-inductive type so as not to interfere with antenna matching. The rest of the power is conducted by resistor 28 to conductor 26 and antenna 12. Incoming signals are shunted across series circuit consisting of resistor 28 and lamp 25, which form a voltage divider circuit. The center conductor 17, being connected to arm 15 and pole 22, sees only the divided fraction of the voltage signal and couples it to the transceiver 11. My novel means also has an additional advantage besides protecting the transceiver from high incoming power, i.e., when the unit is in the protective mode, the CB unit can be used in close quarters such as campgrounds. This prevents interference with units that are, for example, more than ⅛ mile from the transmitting unit.

Having described the preferred embodiment of my invention, one skilled in the art, after studying the preferred embodiment, could devise other embodiments without departing from the spirit and scope of my invention. Therefore, my invention is to be considered as limited only by the scope of the appended claims.

I claim:

1. A circuit capable of being coupled between two lengths of coaxial cable which in turn couples a transceiver and an antenna, said circuit comprising;
    a double throw switch having first and second poles and an arm which makes alternate contact between said poles;
    one length of said coaxial cable having a center conductor which is coupled to said arm;
    the other length of said coaxial cable having a center conductor which is coupled to said first pole;
    a first impedance coupled between said center conductors;
    a second impedance coupled between said second pole and both outer conductors of said both lengths of cable so that when said arm contacts said first pole said first and second impedances are out of the circuit and when said arm contacts said second pole said first impedance is a part of said center conductor and second impedance forms short circuit between the center and outer conductors.

2. The circuit of claim 1 wherein;
    said arm is coupled to said length which coupled to the transceiver;
    said first pole is coupled to said length which is coupled to the antenna.

3. The circuit of claim 2 wherein:
    said first impedance is a resistor;
    said second impedance being an electrical illuminating bulb.

4. The circuit of claim 3 wherein:
    said resistor has a value between 5000 and 8000 ohms;
    said bulb has a rating of 6 watts and approximately 12 volts.

* * * * *